United States Patent
Lee et al.

(10) Patent No.: US 10,895,931 B2
(45) Date of Patent: Jan. 19, 2021

(54) TOUCH DISPLAY APPARATUS

(71) Applicant: Au Optronics Corporation, Hsinchu (TW)

(72) Inventors: Chia-Chi Lee, Hsinchu (TW); Yu-Zhang Huang, Hsinchu (TW); He-Yi Cheng, Kaohsiung (TW); Zeng-De Chen, Yunlin County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/593,965

(22) Filed: Oct. 4, 2019

(65) Prior Publication Data

US 2020/0387281 A1    Dec. 10, 2020

(30) Foreign Application Priority Data

Jun. 5, 2019 (TW) .............................. 108119560 A

(51) Int. Cl.
*G06F 3/041* (2006.01)
*G06F 3/044* (2006.01)
*G02F 1/1333* (2006.01)
*G02F 1/1335* (2006.01)

(52) U.S. Cl.
CPC ........ *G06F 3/04164* (2019.05); *G06F 3/0412* (2013.01); *G06F 3/04166* (2019.05); *G02F 1/13338* (2013.01); *G02F 1/133514* (2013.01); *G06F 3/044* (2013.01)

(58) Field of Classification Search
CPC ........... G02F 1/13338; G02F 1/133514; G06F 3/0412; G06F 3/044; G06F 3/0416; G06F 3/3648; G06F 2203/04103; G09G 2300/0426; G09G 2300/0465
See application file for complete search history.

(56) References Cited

U.S. PATENT DOCUMENTS

| | | | |
|---|---|---|---|
| 9,274,636 B2 | 3/2016 | Xu | |
| 9,606,655 B2 | 3/2017 | Choo et al. | |
| 9,690,424 B2 | 6/2017 | Huang et al. | |
| 2008/0186288 A1* | 8/2008 | Chang | G06F 3/0412 345/174 |

(Continued)

FOREIGN PATENT DOCUMENTS

| CN | 101034237 | 9/2007 |
|---|---|---|
| CN | 102402330 | 4/2012 |

(Continued)

*Primary Examiner* — Michael J Eurice
(74) *Attorney, Agent, or Firm* — JCIPRNET

(57) ABSTRACT

A touch display apparatus includes a first transmission line, first and second signal lines, a touch signal line, a control signal line, first and second active devices, a first switch device, first and second pixel electrodes and a touch electrode. The first signal line is parallel and adjacent to the second signal line. The first active device is electrically connected to the first transmission line and the first signal line. The second active device is electrically connected to the first transmission line and the second signal line. The first switch device is electrically connected to the touch signal line and the control signal line. The first and second pixel electrodes are electrically connected to the first and second active devices respectively. The first and second pixel electrodes are not located between the first and second signal lines.

18 Claims, 12 Drawing Sheets

(56) References Cited

U.S. PATENT DOCUMENTS

| | | |
|---|---|---|
| 2012/0056835 A1 | 3/2012 | Choo et al. |
| 2014/0132560 A1 | 5/2014 | Huang et al. |
| 2015/0268774 A1* | 9/2015 | Xu ..................... G06F 3/0412 |
| | | 345/173 |
| 2017/0031507 A1 | 2/2017 | Huang et al. |
| 2017/0177154 A1 | 6/2017 | Choo et al. |
| 2018/0173037 A1 | 6/2018 | Hao |

FOREIGN PATENT DOCUMENTS

| | | |
|---|---|---|
| CN | 103728761 | 4/2014 |
| CN | 105867032 | 8/2016 |
| TW | 201419071 | 5/2014 |

\* cited by examiner

TOUCH DISPLAY APPARATUS

CROSS-REFERENCE TO RELATED APPLICATION

This application claims the priority benefit of Taiwan application serial no. 108119560, filed on Jun. 5, 2019. The entirety of the above-mentioned patent application is hereby incorporated by reference herein and made a part of this specification.

BACKGROUND OF THE DISCLOSURE

Field of the Disclosure

The present disclosure generally relates to a display apparatus, in particular, to a touch display apparatus.

Description of Related Art

Along with development of sciences and technologies, the emergence rate of touch display apparatuses on the market has gradually increased and various related technologies have also emerged one after another. Generally speaking, a touch display apparatus comprises many touch electrodes corresponding to different touch positions, and the specific touch electrode, corresponding to a present position of an external object (for example, a finger), in the touch display apparatus may be calculated by use of a chip. For meeting market requirements, sizes of touch display apparatuses are enlarged year by year and the numbers of touch electrodes and chips required to be arranged in the touch display apparatuses also increase. Due to high cost of a chip, the manufacturing cost of a large-sized touch display apparatus remains high, and it is difficult to reduce the area of a peripheral region for arranging the chip.

SUMMARY OF THE DISCLOSURE

The present disclosure provides a touch display apparatus, which may reduce the number of chips for calculating touch positions.

At least one embodiment of the present disclosure provides a touch display apparatus. The touch display apparatus comprises a substrate, a first transmission line, a first signal line, a second signal line, a touch signal line, a control signal line, a first active device, a second active device, a first switch device, a first pixel electrode, a second pixel electrode and a touch electrode. The substrate has a display region and a peripheral region located on at least one side of the display region. The first transmission line, the first signal line, the second signal line, the touch signal line and the control signal line are located on the substrate. The first signal line is parallel and adjacent to the second signal line. The first active device, the second active device and the first switch device are located on the display region. The first active device is electrically connected to the first transmission line and the first signal line. The second active device is electrically connected to the first transmission line and the second signal line. The first switch device is electrically connected to the touch signal line and the control signal line. The first pixel electrode and the second pixel electrode are electrically connected to the first active device and the second active device respectively. The first pixel electrode and the second pixel electrode are not located between the first signal line and the second signal line. The touch electrode is electrically connected to the first switch device and overlaps the first pixel electrode and the second pixel electrode.

At least one embodiment of the present disclosure provides a touch display apparatus. The touch display apparatus comprises a substrate, a first transmission line, a first signal line, a second signal line, a touch signal line, a control signal line, a first active device, a second active device, a first switch device, a first pixel electrode, a second pixel electrode and a touch electrode. The substrate has a display region and a peripheral region located on at least one side of the display region. The first transmission line, the first signal line, the second signal line, the touch signal line and the control signal line are located on the substrate. The first signal line is parallel to the second signal line. Each of the first signal line and the second signal line has a first side and second side that are opposite to each other. The first side of the first signal line is adjacent to the second side of the second signal line. The first active device is located on the display region and electrically connected to the first transmission line and the first signal line. A drain of the first active device is located on the second side of the first signal line. The second active device is located on the display region and electrically connected to the first transmission line and the second signal line. A drain of the second active device is located on the first side of the second signal line. The first switch device is located on the display region and electrically connected to the touch signal line and the control signal line. The first pixel electrode and the second pixel electrode are electrically connected to the first active device and the second active device respectively. The touch electrode is electrically connected to the first switch device and overlaps the first pixel electrode and the second pixel electrode.

In order to make the aforementioned and other objectives and advantages of the present disclosure comprehensible, embodiments accompanied with figures are described in detail below.

DESCRIPTION OF THE EMBODIMENTS

It should be understood that although terms such as "first", "second", and "third" in this specification may be used for describing various elements, components, areas, layers, and/or parts, the elements, components, areas, layers, and/or parts are not limited by such terms. The terms are only used to distinguish one element, component, area, layer, or part from another element, component, area, layer, or part. Therefore, the "first element", "component, "area", "layer", or "part" described below may also be referred to as a second element, component, area, layer, or part without departing from the teachings of the present disclosure.

Figure 1:
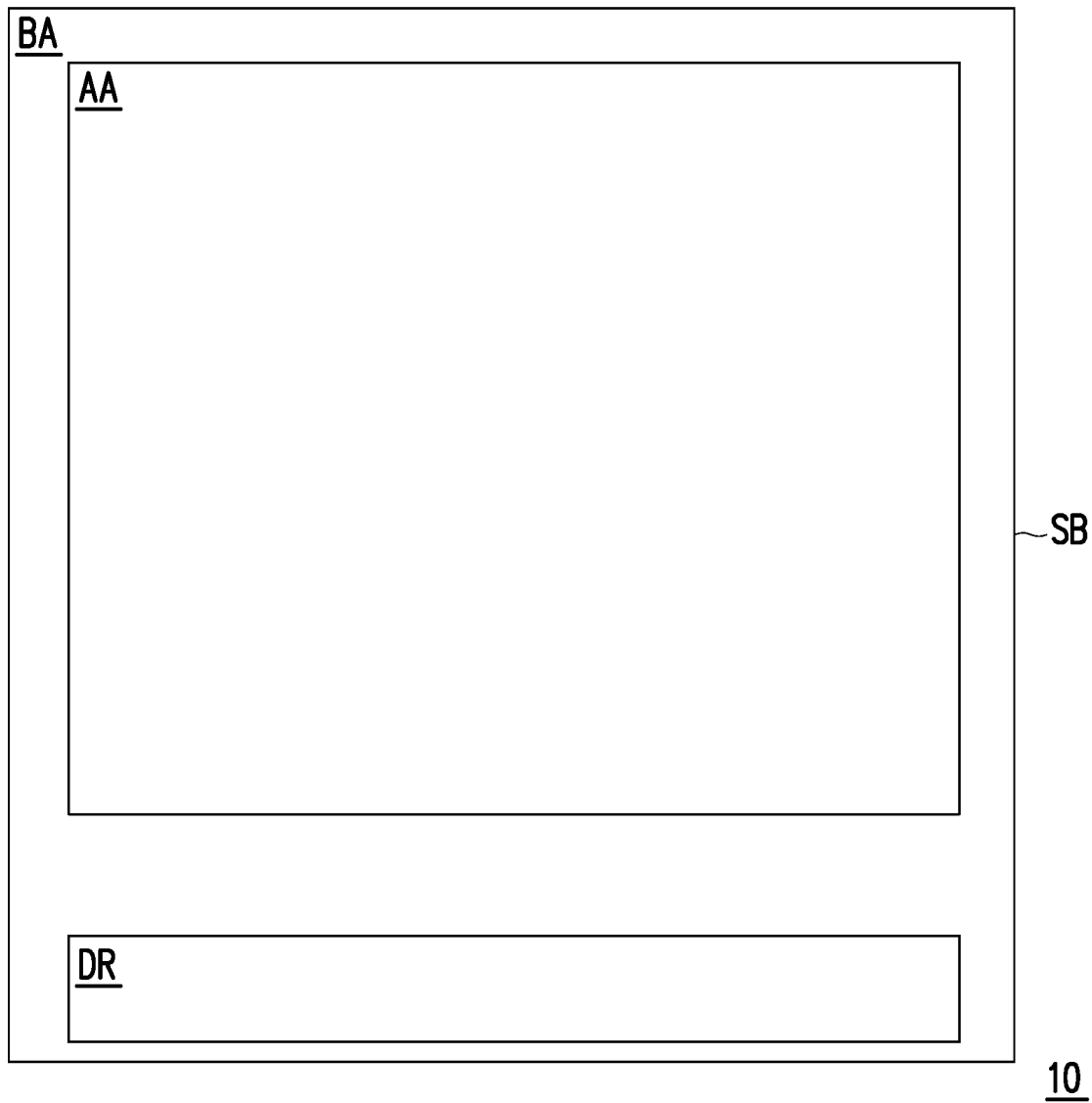
FIG. 1 is a top view of a touch display apparatus according to an embodiment of the present disclosure.

FIG. 1 is a top view of a touch display apparatus according to an embodiment of the present disclosure. For convenient description, FIG. 1 shows a substrate SB and driving circuit DR of the touch display apparatus 10 and does not show part of components.

Referring to FIG. 1, the touch display apparatus 10 comprises the substrate SB and the driving circuit DR. The substrate SB has a display region AA and a peripheral region BA located on at least one side of the display region AA. The driving circuit DR is located on the peripheral region BA. The driving circuit DR comprises, for example, a gate driving circuit, a source driving circuit, a chip and/or other components.

Figure 2A:
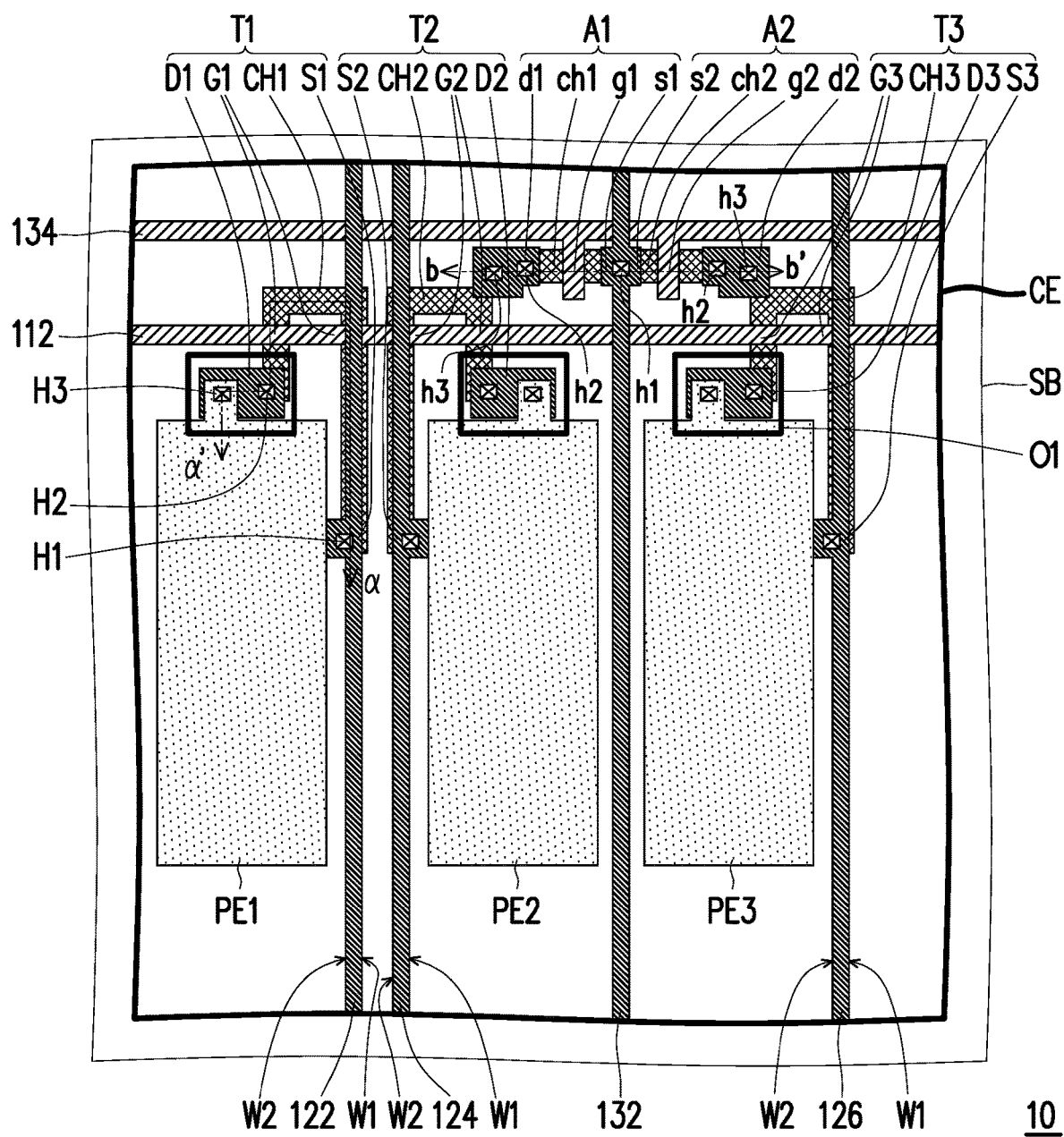
FIG. 2A is a top view of a touch display apparatus according to an embodiment of the present disclosure.
Figure 2B:
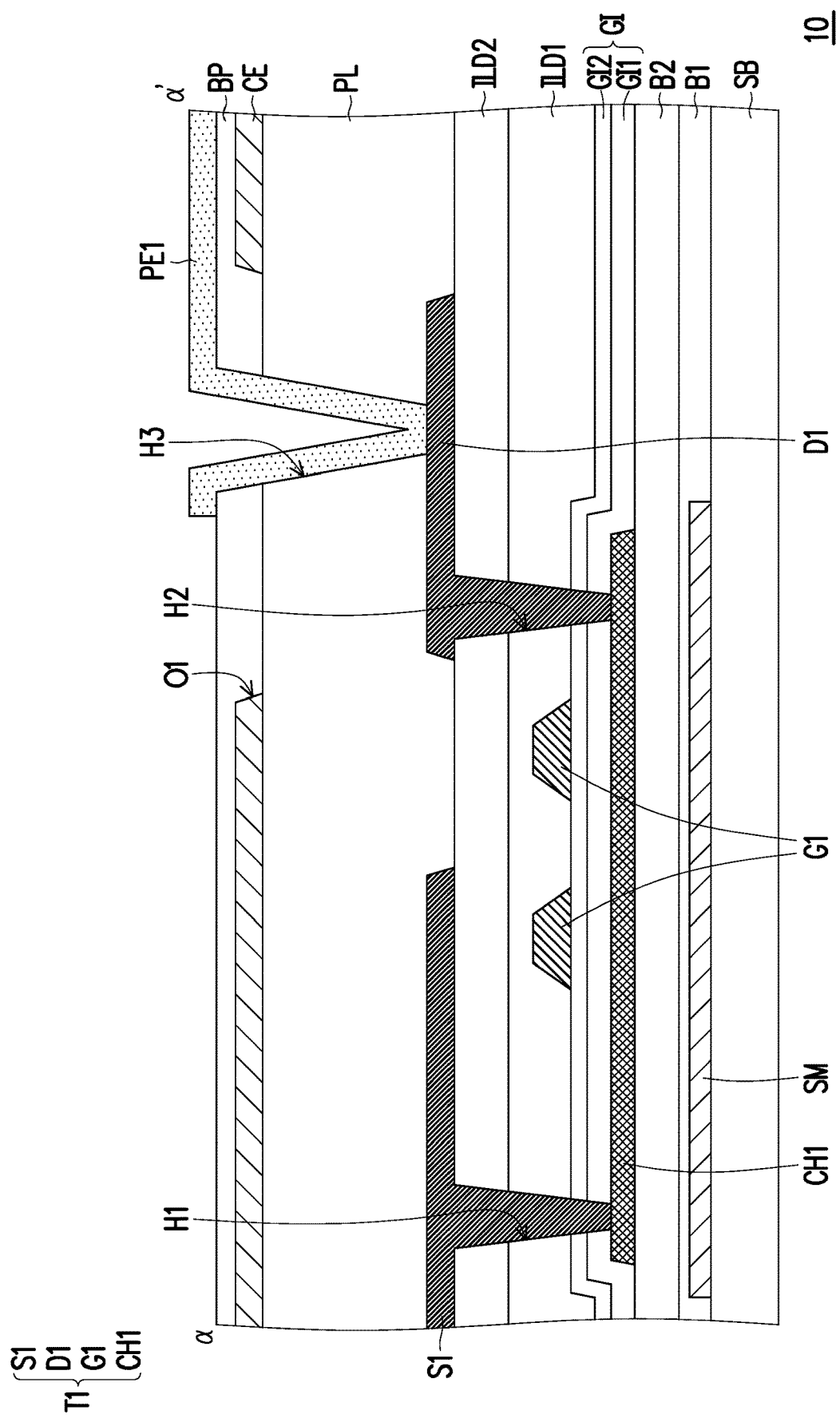
FIG. 2B is a cross-sectional view along section line aa' in FIG. 2A.
Figure 2C:
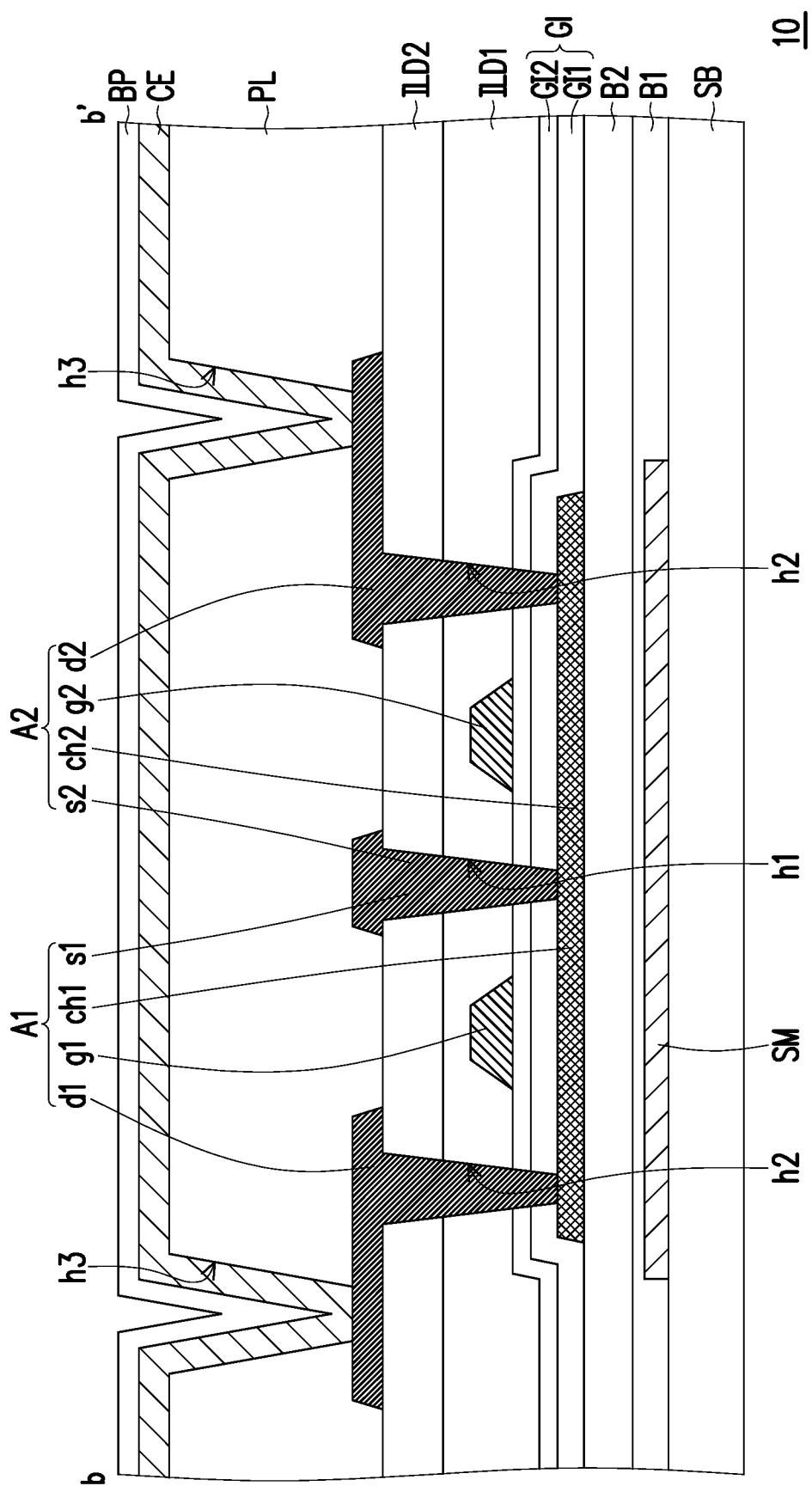
FIG. 2C is a cross-sectional view along section line bb' in FIG. 2A.
Figure 3:
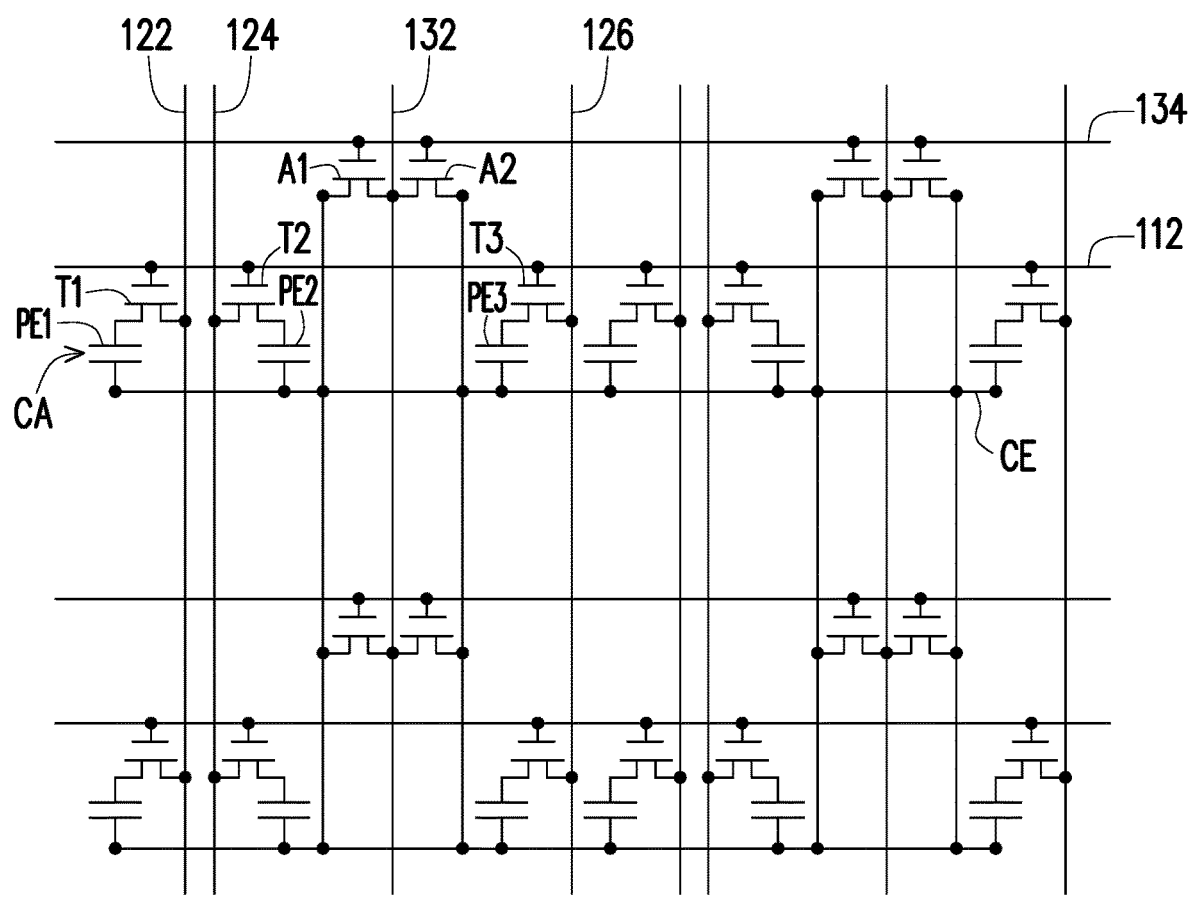
FIG. 3 is a partial circuit diagram of a touch display apparatus according to an embodiment of the present disclosure.

FIG. 2A is a top view of a touch display apparatus according to an embodiment of the present disclosure. FIG. 2B is a cross-sectional view along section line aa' in FIG. 2A. FIG. 2C is a cross-sectional view along section line bb' in FIG. 2A. FIG. 3 is a partial circuit diagram of a touch display apparatus according to an embodiment of the present disclosure. FIG. 2A is, for example, a partial enlarged view of a display region AA in FIG. 1, and FIG. 3 is, for example, a partial circuit diagram of part of components in the display region AA.

Referring to FIG. 2A, FIG. 2B and FIG. 3, the touch display apparatus 10 comprises a substrate SB, a first transmission line 112, a first signal line 122, a second signal line 124, a touch signal line 132, a control signal line 134, a first active device T1, a second active device T2, a first switch device A1, a first pixel electrode PE1, a second pixel electrode PE2 and a touch electrode CE. In the present embodiment, the touch display apparatus 10 further comprises a third signal line 126, a third active device T3, a third pixel electrode PE3 and a second switch device A2.

The first transmission line 112, the first signal line 122, the second signal line 124, the third signal line 126, the touch signal line 132, the control signal line 134, the first active device T1, the second active device T2, the third active device T3, the first switch device A1, the second switch device A2, the first pixel electrode PE1, the second pixel electrode PE2, the third pixel electrode PE3 and the touch electrode CE are located on a display region AA of the substrate SB.

In the present embodiment, the first signal line 122, the second signal line 124, the third signal line 126 and the touch signal line 132 are parallel, and the first signal line 122, the second signal line 124 and the third signal line 126 are data lines. The first transmission line 112 is parallel to the control signal line 134, and the first transmission line 112 is a scan line.

The first active device T1 comprises a channel layer CH1, a gate G1, a source S1 and a drain D1. The channel layer CH1 is located on the substrate SB. In the present embodiment, a shading layer SM, a first buffer layer B1 and a second buffer layer B2 may further be arranged between the channel layer CH1 and the substrate SB, but the present disclosure is not limited thereto. The first buffer layer B1 and the second buffer layer B2 are prepared from, for example, a nitride of silicon and an oxide of silicon respectively. Through the shading layer SM, the problem of electric leakage of the first active device T1 may be improved.

The gate G1 is electrically connected to the first transmission line 112. The gate G1 overlaps the channel layer CH1, and a gate insulating layer GI is arranged between the gate G1 and the channel layer CH1. In the present embodiment, the gate insulating layer GI is of a double-layer structure, and comprises a first gate insulating layer GI1 and a second gate insulating layer GI2. The first gate insulating layer GI1 and the second gate insulating layer GI2 are prepared from, for example, an oxide of silicon and a nitride of silicon respectively, but the present disclosure is not limited thereto.

A first insulating layer ILD1 and a second insulating layer ILD2 sequentially cover the gate G1, and the first insulating layer ILD1 and the second insulating layer ILD2 are located between the first transmission line 112 and the first signal line 122. The first insulating layer ILD1 and the second insulating layer ILD2 are prepared from, for example, an oxide of silicon and a nitride of silicon respectively, but the present disclosure is not limited thereto.

The source S1 and the drain D1 are located on the second insulating layer ILD2 and electrically connected to the channel layer CH1 through openings H1 and H2 respectively. In the present embodiment, the openings H1 and H2 penetrate through the gate insulating layer GI, the first insulating layer ILD1 and the second insulating layer ILD2. The source S1 is electrically connected to the first signal line 122.

In the present embodiment, the first active device T1 is, for example, a thin film transistor of a top-gate type, but the present disclosure is not limited thereto. In other embodiments, the first active device T1 may also be a thin film transistor of a bottom-gate type or other types.

The first active device T1, the second active device T2 and the third active device T3 are of similar structures. The same or similar sign numbers are adopted to denote the same or similar devices and descriptions about the same technical contents are omitted.

The second active device T2 comprises a channel layer CH2, a gate G2, a source S2 and a drain D2. The second active device T2 is electrically connected to the first transmission line 112 and the second signal line 124. In the present embodiment, the gate G2 of the second active device T2 is electrically connected to the first transmission line 112, and the source S2 of the second active device T2 is electrically connected to the second signal line 124.

The third active device T3 comprises a channel layer CH3, a gate G3, a source S3 and a drain D3. The third active device T3 is electrically connected to the first transmission line 112 and the third signal line 126. In the present embodiment, the gate G3 of the third active device T3 is electrically connected to the first transmission line 112, and the source S3 of the third active device T3 is electrically connected to the third signal line 126.

Referring to FIG. 2A, FIG. 2C and FIG. 3, the first switch device A1 comprises a channel layer ch1, a gate g1, a source s1 and a drain d1. The channel layer ch1 is located on the substrate SB. In the present embodiment, a shading layer SM, a first buffer layer B1 and a second buffer layer B2 may further be arranged between the channel layer ch1 and the substrate SB, but the present disclosure is not limited thereto. The first buffer layer B1 and the second buffer layer B2 are prepared from, for example, a nitride of silicon and an oxide of silicon respectively. Through the shading layer SM, the problem of electric leakage of the first switch device T1 may be improved.

The gate g1 is electrically connected to the control signal line 134. The gate g1 overlaps the channel layer ch1, and a gate insulating layer GI is arranged between the gate g1 and the channel layer ch1.

A first insulating layer ILD1 and a second insulating layer ILD2 sequentially cover the gate g1, and the first insulating layer ILD1 and the second insulating layer ILD2 are located between the control signal line 134 and the touch signal line 132.

The source s1 and the drain d1 are located on the second insulating layer ILD2 and electrically connected to the channel layer CH1 through openings h1 and h2 respectively. In the present embodiment, the openings h1 and h2 penetrate through the gate insulating layer GI, the first insulating layer ILD1 and the second insulating layer ILD2. The source s1 is electrically connected to the touch signal line 132.

In the present embodiment, the first switch device A1 is, for example, a thin film transistor of a top-gate type, but the present disclosure is not limited thereto. In other embodiments, the first switch device A1 may also be a thin film transistor of a bottom-gate type or other types.

The first switch device A1 and the second switch device A2 are of similar structures. The same or similar sign numbers are adopted to denote the same or similar devices and descriptions about the same technical contents are omitted.

The second switch device A2 comprises a channel layer ch2, a gate g2, a source s2 and a drain d2. The second switch device A2 is electrically connected to the control signal line 134 and the touch signal line 132. In the present embodiment, the gate G2 of the second switch device A2 is electrically connected to the control signal line 134, and the source s2 of the second switch device A2 is electrically connected to the touch signal line 132. In the present embodiment, the gate g1 of the first switch device A1 and the gate g2 of the second switch device A2 are located on two sides of the touch signal line 132 respectively, and the channel layer ch1 of the first switch device A1 is connected with the channel layer ch2 of the second switch device A2. The source s1 of the first switch device A1 is actually connected together with the source s2 of the second switch device A2, that is, the first switch device A1 and the second switch device A2 share the source. Therefore, influence of the first switch device A1 and the second switch device A2 on an aperture ratio of the touch display apparatus 10 is reduced.

In the present embodiment, the first switch device A1 and second switch device A2 located on the display region are used for controlling a touch signal on a touch electrode to be turned on or turned off, and may be used as multiplexers. Therefore, the number of chips for calculating touch positions on a peripheral region may be reduced, and the area of the peripheral region is reduced.

Referring to FIG. 2B and FIG. 2C, a planar layer PL covers the first active device T1, the second active device T2, the third active device T3, the first switch device A1 and the second switch device A2. A touch electrode CE is located on the planar layer PL, and has multiple openings O1 corresponding to the first active device T1, the second active device T2 and the third active device T3. An insulating layer BP covers the touch electrode CE.

The touch electrode CE is electrically connected to the drain d1 of the first switch device A1 and the drain d2 of the second switch device A2 through two openings h3 respectively. In other words, the first switch device A1 is connected in parallel with the second switch device A2. Therefore, the sizes of the first switch device A1 and the second switch device A2 may be reduced, and the visual effect of reducing impedance generated by Ron/Roff of the gate g1 and the gate g2 at different positions and aperture ratio differences is achieved.

The first pixel electrode PE1, the second pixel electrode PE2 and the third pixel electrode PE3 cover the insulating layer BP, and are separated from the touch electrode CE. The first pixel electrode PE1, the second pixel electrode PE2 and the third pixel electrode PE3 are electrically connected to the drain D1 of the first active device T1, the drain D2 of the second active device T2 and the drain D3 of the third active device T3 through an opening H3 respectively. The opening H3 penetrates through the insulating layer BP and the planar layer PL. The touch electrode CE overlaps the first pixel electrode PE1, the second pixel electrode PE2 and the third pixel electrode PE3, and forms capacitance CA (shown in FIG. 3) with the first pixel electrode PE1, the second pixel electrode PE2 and the third pixel electrode PE3.

The first signal line 122 is adjacent to the second signal line 124. In the present embodiment, each of the first signal line 122, the second signal line 124 and the third signal line 126 has a first side W1 and second side W2 that are opposite to each other. The first side W1 of the first signal line 122 is adjacent to the second side W2 of the second signal line 124. A distance between the first signal line 122 and the second signal line 124 is shorter than a distance between the second signal line 124 and the third signal line 126.

The first pixel electrode PE1 and the drain D1 of the first active device T1 are located on the second side W2 of the first signal line 122. The second pixel electrode PE2 and the drain D2 of the second active device T2 are located on the first side W1 of the second signal line 124. The third pixel electrode PE3 and the drain D3 of the third active device T3 are located on the second side W2 of the third signal line 126. In other words, the first pixel electrode PE1, the second pixel electrode PE2, the third pixel electrode PE3, the drain D1, the drain D2 and the drain D3 are not located between the first signal line 122 and the second signal line 124, and the second pixel electrode PE2, the third pixel electrode PE3, the drain D2 and the drain D3 are located between the second signal line 124 and the third signal line 126.

Based on the above, since the first signal line 122 is adjacent to the second signal line 124, there is a larger space for arrangement of the first switch device A1 and the second switch device A2 in the touch display apparatus 10, and a total width of the channel layers of the first switch device A1 and the second switch device A2 is further increased to reduce impedance between the touch signal line 132 and the touch electrode CE.

Figure 4:
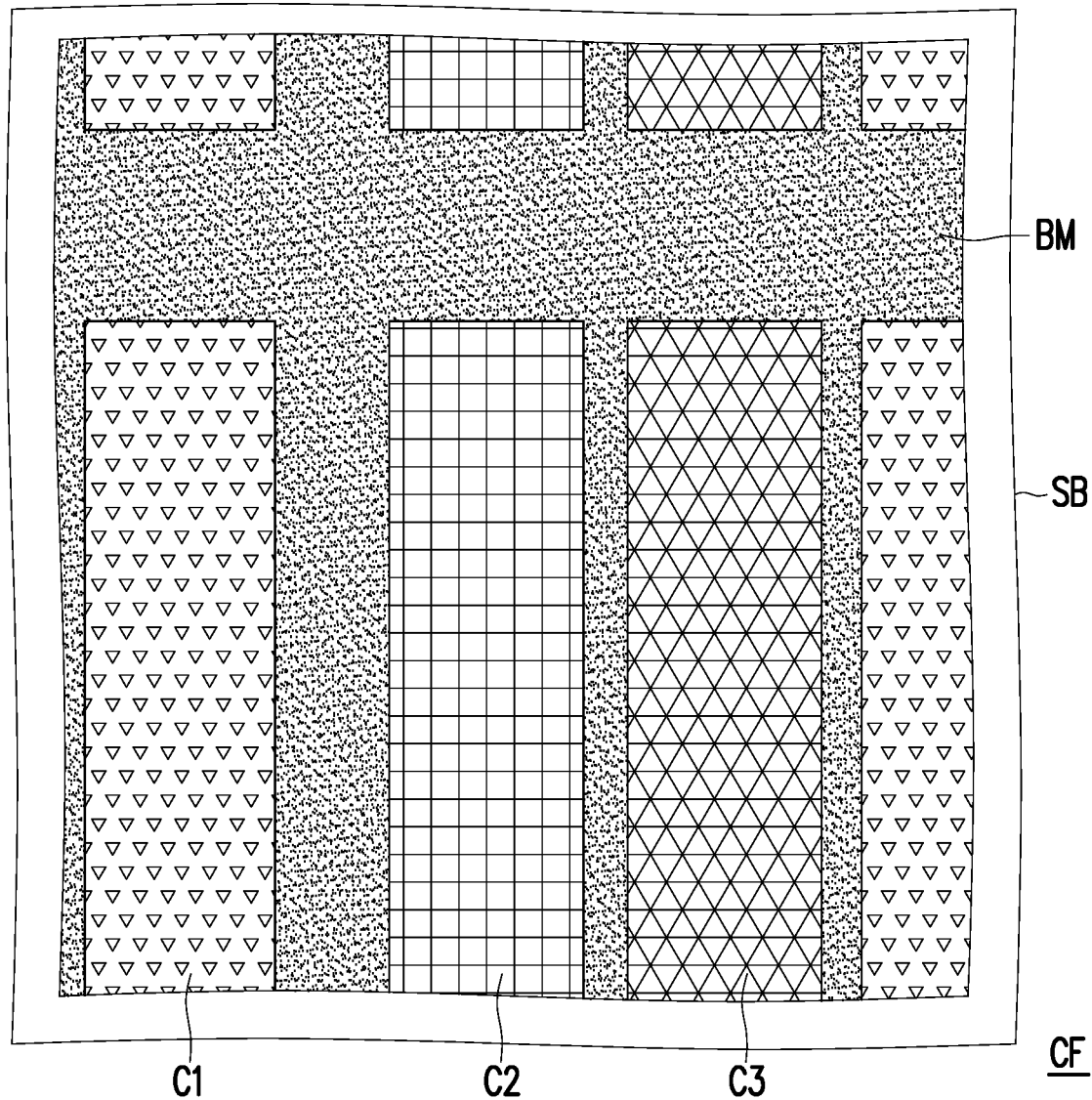
FIG. 4 is a top view of a touch display apparatus according to an embodiment of the present disclosure.

FIG. 4 is a top view of a touch display apparatus according to an embodiment of the present disclosure. It is to be noted here that the element sign numbers and part of contents of the embodiment shown in FIG. 1 to FIG. 3 are reserved in the embodiment shown in FIG. 4, the same or similar sign numbers are adopted to denote the same or similar elements, and descriptions about the same technical contents are omitted. The omitted descriptions may refer to the aforementioned embodiment and no more elaborations will be made herein.

Referring to both FIG. 2A and FIG. 4, in the present embodiment, the touch display apparatus 10 further comprises a colour filter element CF. The colour filter element CF is located on the substrate SB, and the colour filter element CF comprises a green filter element C1, a blue filter element C2, a red filter element C3 and a black matrix BM.

The black matrix BM overlaps the first transmission line 112, the first signal line 122, the second signal line 124, the third signal line 126, the touch signal line 132, the control signal line 134, the first active device T1, the second active device T2, the third active device T3, the first switch device A1 and the second switch device A2.

The green filter element C1, the blue filter element C2 and the red filter element C3 are in an opening of the black matrix BM, and overlap the first pixel electrode PE1, the second pixel electrode PE2 and the third pixel electrode PE3 respectively.

In the present embodiment, the green filter element C1 is farther away from the first switch device A1 than the blue filter element C2 and the red filter element C3. In the present embodiment, the green filter element C1 is farther away from the first switch device A1 and the second switch device A2 than the blue filter element C2 and the red filter element C3.

Based on the above, the influence of the first switch device A1 and the second switch device A2 on the brightness of the touch display apparatus 10 may be reduced.

Figure 5:
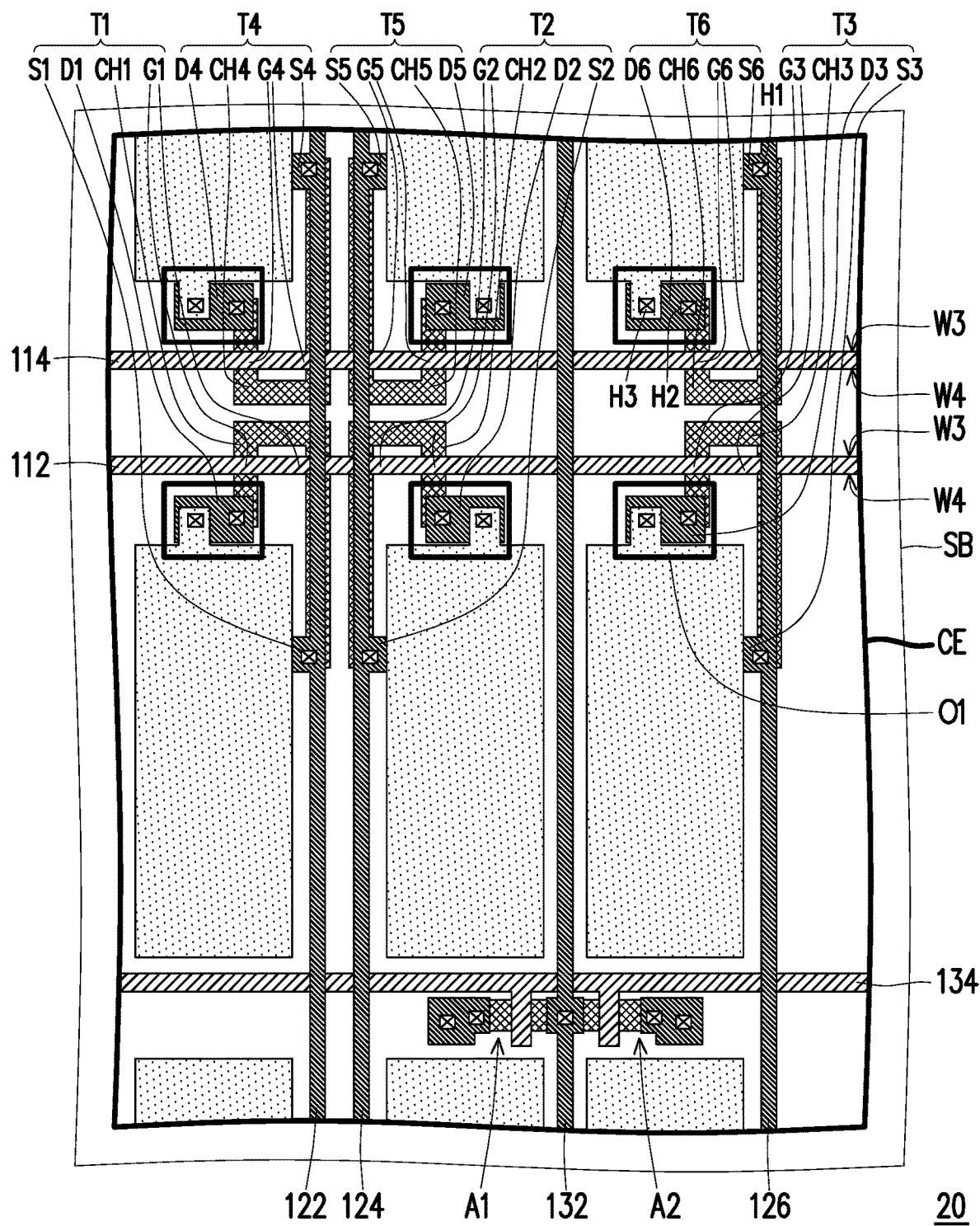
FIG. 5 is a top view of a touch display apparatus according to an embodiment of the present disclosure.
Figure 6:
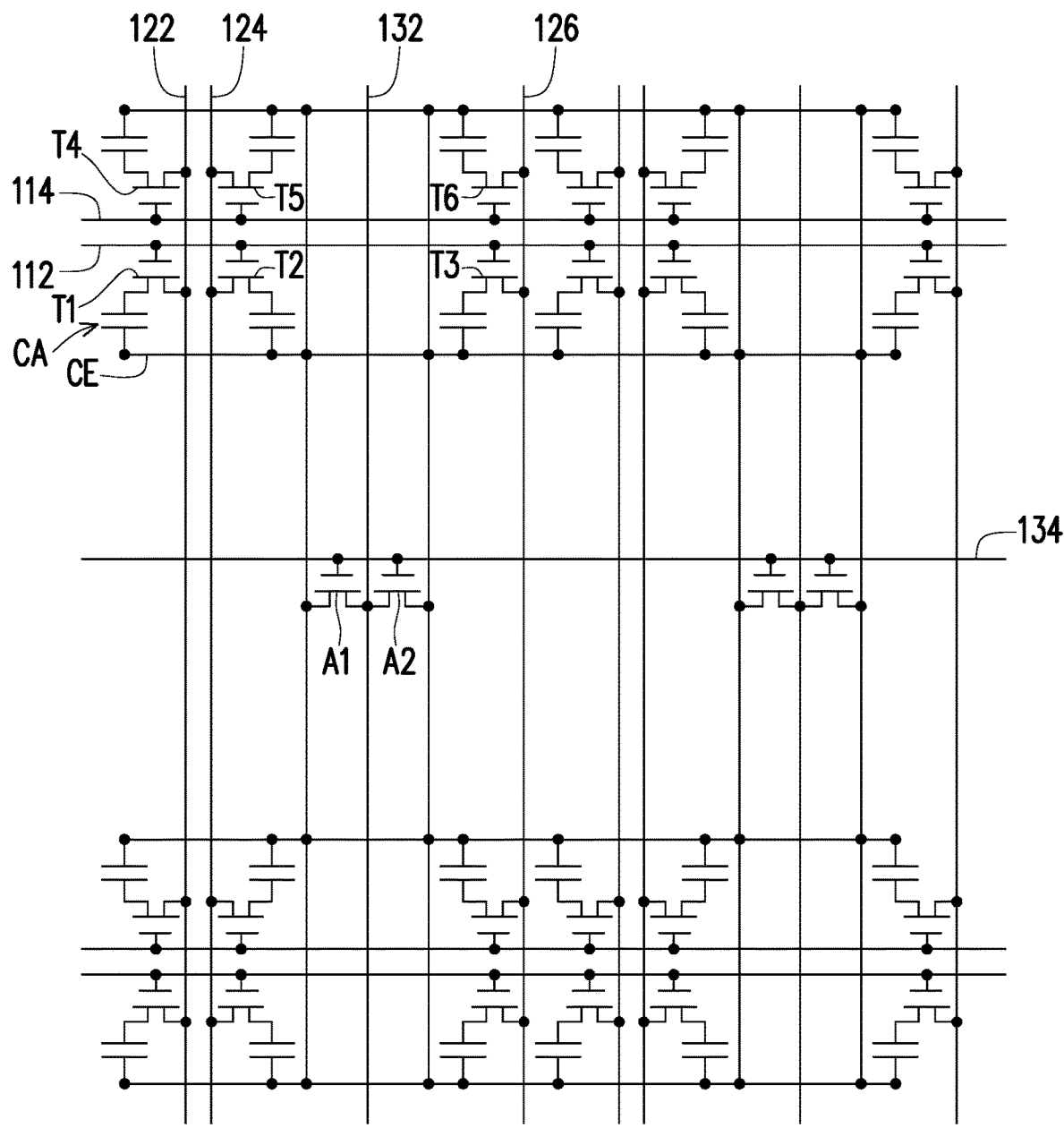
FIG. 6 is a partial circuit diagram of a touch display apparatus according to an embodiment of the present disclosure.

FIG. 5 is a top view of a touch display apparatus according to an embodiment of the present disclosure. FIG. 6 is a partial circuit diagram of a touch display apparatus according to an embodiment of the present disclosure. It is to be noted here that the element sign numbers and part of contents of the embodiment shown in FIG. 1 to FIG. 3 are reserved in the embodiment shown in FIG. 5 and FIG. 6, the same or similar sign numbers are adopted to denote the same or similar elements, and descriptions about the same technical contents are omitted. The omitted descriptions may refer to the aforementioned embodiment and no more elaborations will be made herein.

The main difference between the touch display apparatus 20 in FIG. 5 and the touch display apparatus 10 in FIG. 2A is that the touch display apparatus 20 comprises a second transmission line 114 parallel and adjacent to the first transmission line 112.

Referring to FIG. 5, in the present embodiment, the touch display apparatus 20 further comprises a fourth active device T4, a fifth active device T5, a sixth active device T6, a fourth pixel electrode PE4, a fifth pixel electrode PE5 and a sixth pixel electrode PE6.

The fourth active device T4, the fifth active device T5, the sixth active device T6 and the first active device T1 are of similar structures. The same or similar sign numbers are adopted to denote the same or similar devices and descriptions about the same technical contents are omitted.

The fourth active device T4 comprises a channel layer CH4, a gate G4, a source S4 and a drain D4. The fourth active device T4 is electrically connected to the second transmission line 114 and the first signal line 122. In the present embodiment, the gate G4 of the fourth active device T4 is electrically connected to the second transmission line 114, and the source S4 of the fourth active device T4 is electrically connected to the third signal line 122.

The fifth active device T5 comprises a channel layer CH5, a gate G5, a source S5 and a drain D5. The fifth active device T5 is electrically connected to the second transmission line 114 and the second signal line 124. In the present embodiment, the gate G5 of the fifth active device T5 is electrically connected to the second transmission line 114, and the source S5 of the fifth active device T5 is electrically connected to the second signal line 124.

The sixth active device T6 comprises a channel layer CH6, a gate G6, a source S6 and a drain D6. The sixth active device T6 is electrically connected to the second transmission line 114 and the third signal line 126. In the present embodiment, the gate G6 of the sixth active device T6 is electrically connected to the second transmission line 114, and the source S6 of the sixth active device T6 is electrically connected to the third signal line 126.

The first transmission line 112 is adjacent to the second transmission line 114. In the present embodiment, each of the first transmission line 112 and the second transmission line 114 has a third side W3 and fourth side W4 that are opposite to each other. The third side W3 of the first transmission line 112 is adjacent to the fourth side W4 of the second transmission line 114.

The first pixel electrode PE1, the second pixel electrode PE2, the third pixel electrode PE3, the drain D1, the drain D2 and the drain D3 are located on the fourth side W4 of the first transmission line 112. The fourth pixel electrode PE4, the fifth pixel electrode PE5, the sixth pixel electrode PE6, the drain D4, the drain D5 and the drain D6 are located on the third side W3 of the second transmission line 114. In other words, the first pixel electrode PE1, the second pixel electrode PE2, the third pixel electrode PE3, the fourth pixel electrode PE4, the fifth pixel electrode PE5, the sixth pixel electrode PE6, the drain D1, the drain D2, the drain D3, the drain D4, the drain D5 and the drain D6 are not located between the first transmission line 112 and the second transmission line 114.

Based on the above, since the first signal line 122 is adjacent to the second signal line 124 and the first transmission line 122 is adjacent to the second transmission line 114, there is a larger space for arrangement of the first switch device A1 and the second switch device A2 in the touch display apparatus 20, and the total width of the channel layers of the first switch device A1 and the second switch device A2 is further increased to reduce the impedance between the touch signal line 132 and the touch electrode CE.

Figure 7:
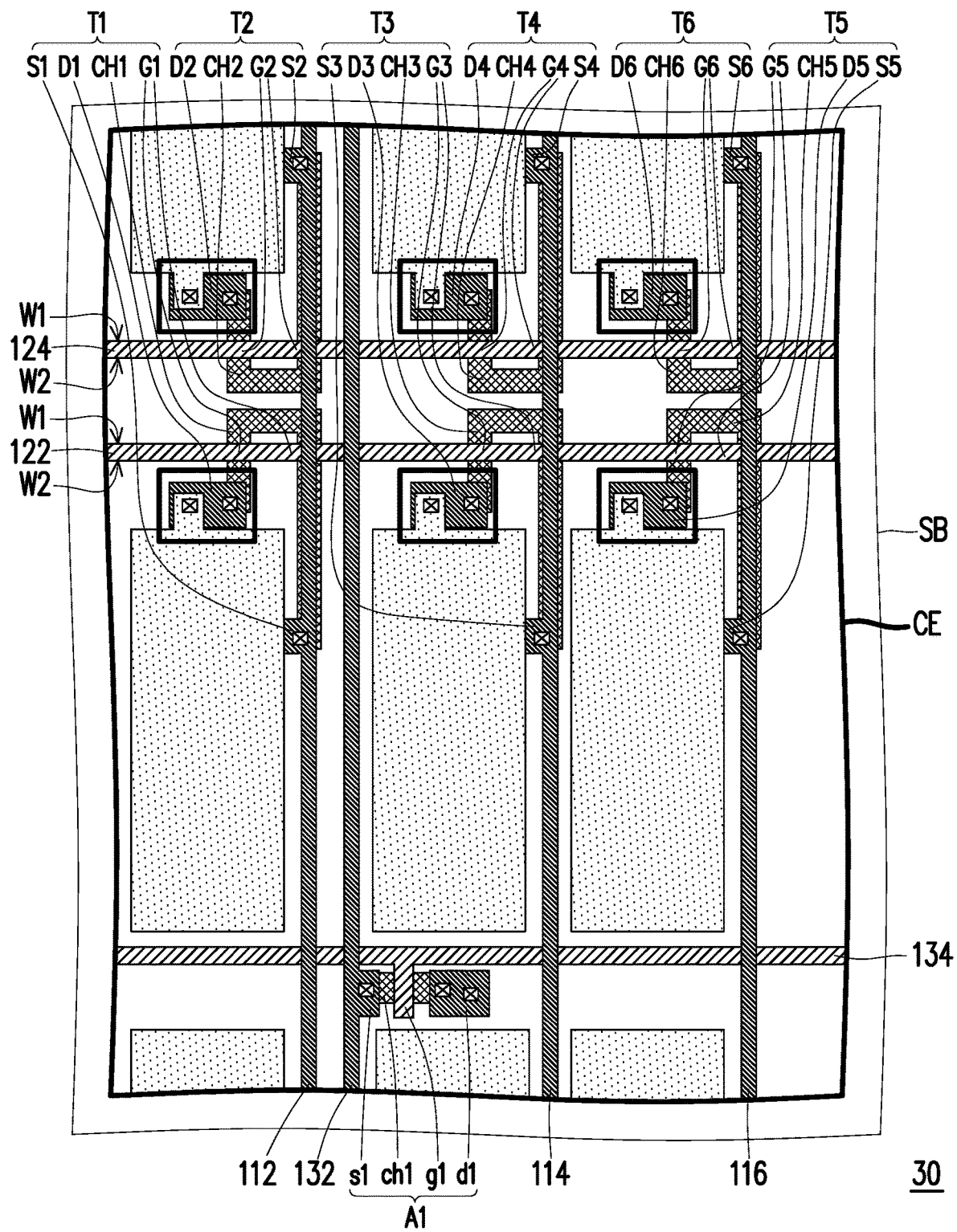
FIG. 7 is a top view of a touch display apparatus according to an embodiment of the present disclosure.
Figure 8:
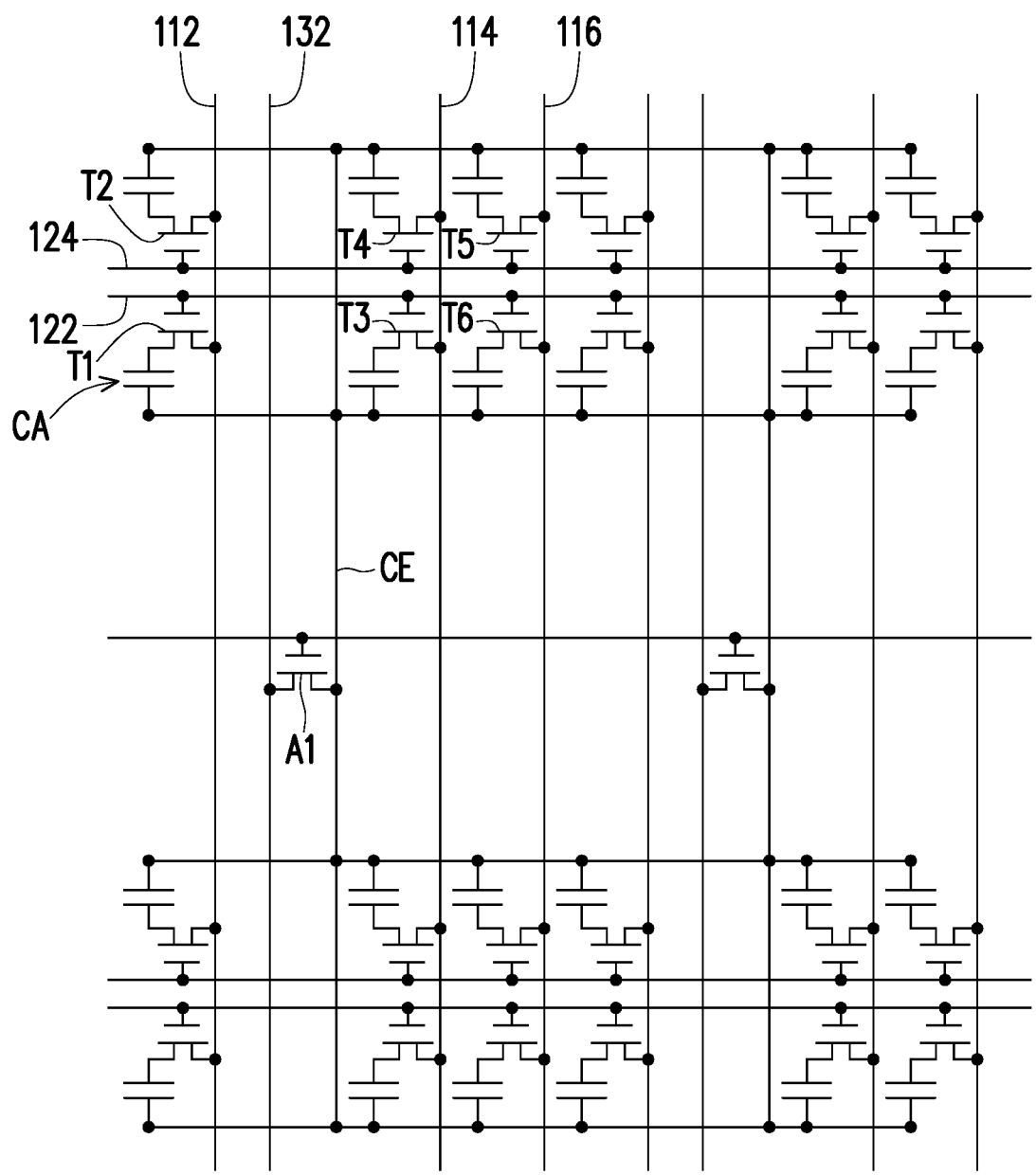
FIG. 8 is a partial circuit diagram of a touch display apparatus according to an embodiment of the present disclosure.

FIG. 7 is a top view of a touch display apparatus according to an embodiment of the present disclosure. FIG. 8 is a partial circuit diagram of a touch display apparatus according to an embodiment of the present disclosure. It is to be noted here that the element sign numbers and part of contents of the embodiment shown in FIG. 5 and FIG. 6 are reserved in the embodiment shown in FIG. 7 and FIG. 8, the same or similar sign numbers are adopted to denote the same or similar elements, and descriptions about the same technical contents are omitted. The omitted descriptions may refer to the aforementioned embodiment and no more elaborations will be made herein.

The main difference between the touch display apparatus 30 in FIG. 7 and the touch display apparatus 20 in FIG. 5 is that the first signal line 122 and second signal line 124 of the touch display apparatus 30 are scan lines, and the first transmission line 112 is a data line.

In the present embodiment, the touch display apparatus 30 comprises the first signal line 122, the second signal line 124, the first transmission line 112, the second transmission line 114 and a third transmission line 116. The first signal line 122 and the second signal line 124 are scan lines, and the first transmission line 112, the second transmission line 114 and the third transmission line 116 are data lines. The first signal line 122, the second signal line 124 and the control signal line 134 are parallel. The first transmission line 112, the second transmission line 114, the third transmission line 116 and the touch signal line 132 are parallel.

The first active device T1 is electrically connected to the first transmission line 112 and the first signal line 122. In the present embodiment, the gate G1 of the first active device T1 is electrically connected to the first signal line 122, and the source S1 of the first active device T1 is electrically connected to the first transmission line 112.

The second active device T2 is electrically connected to the first transmission line 112 and the second signal line 124. In the present embodiment, the gate G2 of the second active device T2 is electrically connected to the second signal line 124, and the source S2 of the second active device T2 is electrically connected to the first transmission line 112.

The third active device T3 is electrically connected to the second transmission line 114 and the first signal line 122. In the present embodiment, the gate G3 of the third active device T3 is electrically connected to the first signal line 122, and the source S3 of the third active device T3 is electrically connected to the second transmission line 114.

The fourth active device T4 is electrically connected to the second transmission line 114 and the second signal line 124. In the present embodiment, the gate G4 of the fourth active device T4 is electrically connected to the second signal line 124, and the source S4 of the fourth active device T4 is electrically connected to the second transmission line 114.

The fifth active device T5 is electrically connected to the third transmission line 116 and the first signal line 122. In the present embodiment, the gate G5 of the fifth active device T5 is electrically connected to the first signal line 122, and the source S5 of the fifth active device T5 is electrically connected to the third transmission line 116.

The sixth active device T6 is electrically connected to the third transmission line 116 and the second signal line 124. In the present embodiment, the gate G6 of the sixth active device T6 is electrically connected to the second signal line 124, and the source S6 of the sixth active device T6 is electrically connected to the third transmission line 116.

In the present embodiment, the control signal line 134 and the first signal line 122 are located on two sides of the first pixel electrode PE1 respectively, and the touch signal line 132 is adjacent to the first transmission line 112.

Based on the above, since the first signal line 122 is adjacent to the second signal line 124, there is a larger space for arrangement of the first switch device A1 in the touch display apparatus 30, and the total width of the channel layer of the first switch device A1 is further increased to reduce the impedance between the touch signal line 132 and the touch electrode CE.

Figure 9:
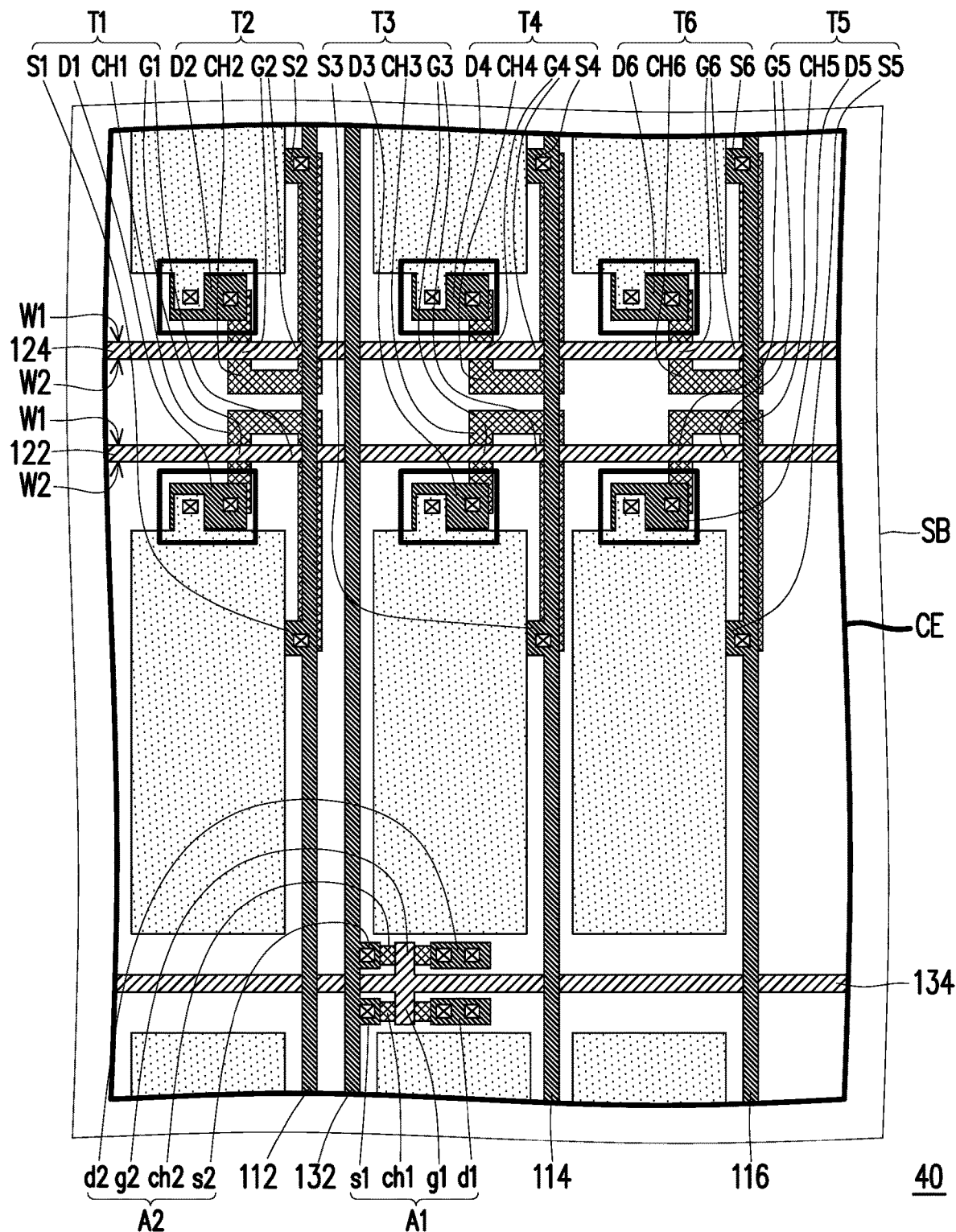
FIG. 9 is a top view of a touch display apparatus according to an embodiment of the present disclosure.
Figure 10:
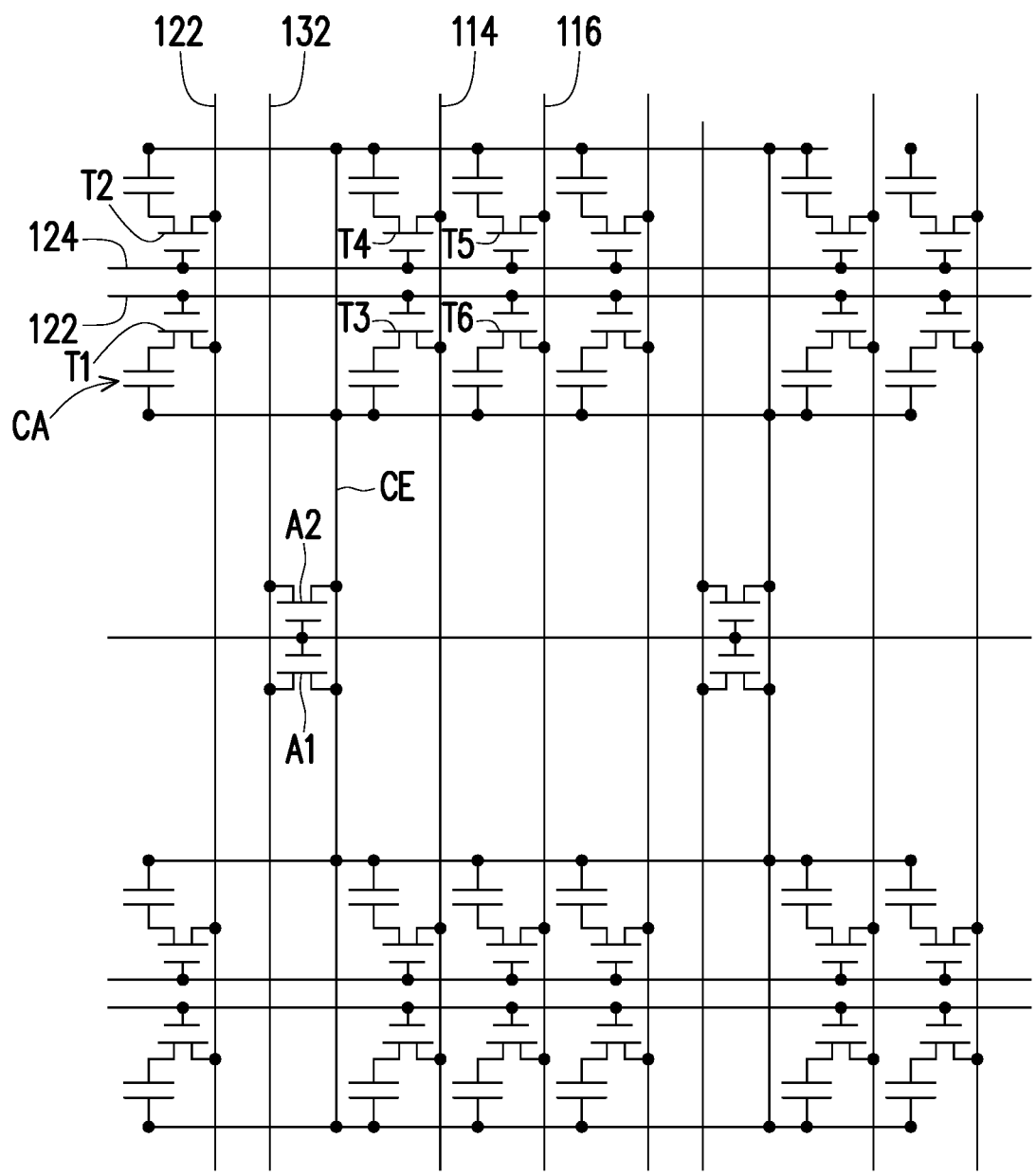
FIG. 10 is a partial circuit diagram of a touch display apparatus according to an embodiment of the present disclosure.

FIG. 9 is a top view of a touch display apparatus according to an embodiment of the present disclosure. FIG. 10 is a partial circuit diagram of a touch display apparatus according to an embodiment of the present disclosure. It is to be noted here that the element sign numbers and part of contents of the embodiment shown in FIG. 7 and FIG. 8 are reserved in the embodiment shown in FIG. 9 and FIG. 10, the same or similar sign numbers are adopted to denote the same or similar elements, and descriptions about the same technical contents are omitted. The omitted descriptions may refer to the aforementioned embodiment and no more elaborations will be made herein.

The main difference between the touch display apparatus 40 in FIG. 9 and the touch display apparatus 30 in FIG. 7 is that the touch display apparatus 40 further comprises the second switch device A2.

The second switch device A2 is electrically connected to the touch signal line 132 and the control signal line 134. The first switch device A1 and the second switch device A2 are located on two sides of the control signal line 134 respectively.

Based on the above, since the first signal line 122 is adjacent to the second signal line 124, there is a larger space for arrangement of the first switch device A1 and the second switch device A2 in the touch display apparatus 30, and the total width of the channel layers of the first switch device A1 and the second switch device A2 is further increased to reduce the impedance between the touch signal line 132 and the touch electrode CE.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A touch display apparatus, comprising:
   a substrate, having a display region and a peripheral region located on at least one side of the display region;
   a first transmission line, a first signal line, a second signal line, a touch signal line and a control signal line, located on the substrate, wherein the first signal line is parallel and adjacent to the second signal line, wherein the first signal line and the second signal line are scan lines, and the first transmission line is a data line; or the first signal line and the second signal line are data lines, and the first transmission line is a scan line;
   a first active device, located on the display region and electrically connected to the first transmission line and the first signal line;
   a second active device, located on the display region and electrically connected to the first transmission line and the second signal line;
   a first switch device, located on the display region and electrically connected to the touch signal line and the control signal line;
   a first pixel electrode and a second pixel electrode, electrically connected to the first active device and the second active device respectively, wherein a vertical projection of the first signal line on the substrate and a vertical projection of the second signal line on the substrate are located between a vertical projection of the first pixel electrode on the substrate and a vertical projection of the second pixel electrode on the substrate;
   a touch electrode, electrically connected to the first switch device and overlapping the first pixel electrode and the second pixel electrode; and
   a second switch device, electrically connected to the touch signal line and the control signal line, wherein a channel layer of the first switch device is connected with a channel layer of the second switch device.

2. The touch display apparatus according to claim 1, wherein a gate of the first switch device and a gate of the second switch device are located on two sides of the touch signal line respectively.

3. The touch display apparatus according to claim 1, further comprising:

a blue filter element, a green filter element and a red filter element, located on the substrate, wherein the green filter element is farther away from the first switch device than the blue filter element and the red filter element.

4. The touch display apparatus according to claim 1, wherein the first signal line, the second signal line and the touch signal line are parallel, the first signal line and the second signal line are the data lines, the first transmission line is parallel to the control signal line, and the first transmission line is the scan line.

5. The touch display apparatus according to claim 4, further comprising:
a third signal line, parallel to the first signal line;
a third active device, electrically connected to the third signal line and the first transmission line; and
a third pixel electrode, electrically connected to the third active device, wherein the second pixel electrode and the third pixel electrode are located between the second signal line and the third signal line.

6. The touch display apparatus according to claim 5, further comprising:
a second transmission line, parallel and adjacent to the first transmission line, wherein the first transmission line and the second transmission line are the scan lines;
a fourth active device, electrically connected to the first signal line and the second transmission line; and
a fourth pixel electrode, electrically connected to the fourth active device, wherein the vertical projection of the first transmission line on the substrate and the vertical projection of the second transmission line on the substrate are located between a vertical projection of the third pixel electrode on the substrate and a vertical projection of the fourth pixel electrode on the substrate.

7. A touch display apparatus comprising:
a substrate, having a display region and a peripheral region located on at least one side of the display region;
a first transmission line, a first signal line, a second signal line, a touch signal line and a control signal line, located on the substrate, wherein the first signal line is parallel and adjacent to the second signal line, wherein
the first signal line and the second signal line are scan lines, and the first transmission line is a data line; or
the first signal line and the second signal line are data lines, and the first transmission line is a scan line;
a first active device, located on the display region and electrically connected to the first transmission line and the first signal line;
a second active device, located on the display region and electrically connected to the first transmission line and the second signal line;
a first switch device, located on the display region and electrically connected to the touch signal line and the control signal line;
a first pixel electrode and a second pixel electrode, electrically connected to the first active device and the second active device respectively, wherein a vertical projection of the first signal line on the substrate and a vertical projection of the second signal line on the substrate are located between a vertical projection of the first pixel electrode on the substrate and a vertical projection of the second pixel electrode on the substrate;
a touch electrode, electrically connected to the first switch device and overlapping the first pixel electrode and the second pixel electrode, and a second switch device, electrically connected to the touch signal line and the control signal line, wherein the first switch device and the second switch device are located on two sides of the control signal line respectively.

8. The touch display apparatus according to claim 7, wherein the control signal line and the first signal line are located on two sides of the first pixel electrode respectively.

9. The touch display apparatus according to claim 7, wherein the first signal line, the second signal line and the control signal line are parallel, the first signal line and the second signal line are the scan lines, the first transmission line is parallel to the touch signal line, and the first transmission line is the data line.

10. A touch display apparatus, comprising:
a substrate, having a display region and a peripheral region located on at least one side of the display region;
a first transmission line, a first signal line, a second signal line, a touch signal line and a control signal line, located on the substrate, wherein the first signal line is parallel to the second signal line, each of the first signal line and the second signal line has a first side and second side opposite to each other, and the first side of the first signal line is adjacent to the second side of the second signal line, wherein
the first signal line and the second signal line are scan lines, and the first transmission line is a data line; or
the first signal line and the second signal line are data lines, and the first transmission line is a scan line;
a first active device, located on the display region and electrically connected to the first transmission line and the first signal line, wherein a drain of the first active device is located on the second side of the first signal line;
a second active device, located on the display region and electrically connected to the first transmission line and the second signal line, wherein a drain of the second active device is located on the first side of the second signal line;
a first switch device, located on the display region and electrically connected to the touch signal line and the control signal line;
a first pixel electrode and a second pixel electrode, electrically connected to the first active device and the second active device respectively;
a touch electrode, electrically connected to the first switch device and overlapping the first pixel electrode and the second pixel electrode; and
a second switch device, electrically connected to the touch signal line and the control signal line, wherein a channel layer of the first switch device is connected with a channel layer of the second switch device.

11. The touch display apparatus according to claim 10, wherein a gate of the first switch device and a gate of the second switch device are located on two sides of the touch signal line respectively.

12. The touch display apparatus according to claim 10, wherein the first switch device and the second switch device are located on two sides of the control signal line respectively.

13. The touch display apparatus according to claim 10, wherein the control signal line and the first signal line are located on two sides of the first pixel electrode respectively.

14. The touch display apparatus according to claim 10, wherein the first signal line, the second signal line and the control signal line are parallel, the first signal line and the second signal line are the scan lines, the first transmission line is parallel to the touch signal line, and the first transmission line is the data line.

15. The touch display apparatus according to claim 10, further comprising:
   a blue filter element, a green filter element and a red filter element, located on the substrate, wherein the green filter element is farther away from the first switch device than the blue filter element and the red filter element.

16. The touch display apparatus according to claim 10, wherein the first signal line, the second signal line and the touch signal line are parallel, the first signal line and the second signal line are the data lines, the first transmission line is parallel to the control signal line, and the first transmission line is the scan line.

17. The touch display apparatus according to claim 16, further comprising:
   a third signal line, parallel to the first signal line;
   a third active device, electrically connected to the third signal line and the first transmission line; and
   a third pixel electrode, electrically connected to the third active device, wherein the second pixel electrode and the third pixel electrode are located between the second signal line and the third signal line.

18. The touch display apparatus according to claim 17, further comprising:
   a second transmission line, parallel and adjacent to the first transmission line, wherein the first transmission line and the second transmission line are the scan lines;
   a fourth active device, electrically connected to the first signal line and the second transmission line; and
   a fourth pixel electrode, electrically connected to the fourth active device, wherein a vertical projection of the first transmission line on the substrate and a vertical projection of the second transmission line on the substrate are located between a vertical projection of the third pixel electrode on the substrate and a vertical projection of the fourth pixel electrode on the substrate.

* * * * *